US007496495B2

(12) United States Patent
Solomon et al.

(10) Patent No.: US 7,496,495 B2
(45) Date of Patent: Feb. 24, 2009

(54) VIRTUAL OPERATING SYSTEM DEVICE COMMUNICATION RELYING ON MEMORY ACCESS VIOLATIONS

(75) Inventors: Andrew R. Solomon, Kent, WA (US); Dinarte R. Morais, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 493 days.

(21) Appl. No.: 11/128,460

(22) Filed: May 12, 2005

(65) Prior Publication Data

US 2006/0259292 A1 Nov. 16, 2006

(51) Int. Cl.
*G06F 9/455* (2006.01)
(52) U.S. Cl. .............................. 703/26; 703/23; 703/24; 711/100; 711/152; 711/203; 710/5; 710/28; 710/37
(58) Field of Classification Search ................... 703/23, 703/26, 27; 711/6, 163, 202, 203; 718/1
See application file for complete search history.

(56) References Cited

U.S. PATENT DOCUMENTS

| | | | | | |
|---|---|---|---|---|---|
| 4,456,954 | A | * | 6/1984 | Bullions et al. | 711/207 |
| 4,974,159 | A | * | 11/1990 | Hargrove et al. | 703/27 |
| 5,437,033 | A | * | 7/1995 | Inoue et al. | 714/10 |
| 6,282,657 | B1 | * | 8/2001 | Kaplan et al. | 726/1 |
| 6,321,314 | B1 | * | 11/2001 | Van Dyke | 711/163 |
| 6,397,242 | B1 | * | 5/2002 | Devine et al. | 718/1 |
| 6,496,847 | B1 | * | 12/2002 | Bugnion et al. | 718/1 |
| 6,651,132 | B1 | * | 11/2003 | Traut | 711/6 |
| 6,732,220 | B2 | * | 5/2004 | Babaian et al. | 711/6 |
| 7,103,529 | B2 | * | 9/2006 | Zimmer | 703/27 |
| 7,111,145 | B1 | * | 9/2006 | Chen et al. | 711/206 |
| 7,124,273 | B2 | * | 10/2006 | Glew et al. | 711/202 |
| 7,127,548 | B2 | * | 10/2006 | Bennett et al. | 711/6 |
| 7,191,440 | B2 | * | 3/2007 | Cota-Robles et al. | 718/1 |
| 7,275,028 | B2 | * | 9/2007 | Traut | 703/23 |
| 7,296,267 | B2 | * | 11/2007 | Cota-Robles et al. | 718/1 |
| 7,318,141 | B2 | * | 1/2008 | Bennett et al. | 711/202 |
| 2002/0013802 | A1 | * | 1/2002 | Mori et al. | 709/1 |
| 2002/0099532 | A1 | * | 7/2002 | Traut | 703/27 |
| 2002/0144077 | A1 | * | 10/2002 | Andersson et al. | 711/203 |
| 2003/0120856 | A1 | * | 6/2003 | Neiger et al. | 711/6 |

(Continued)

*Primary Examiner*—Kamini S Shah
*Assistant Examiner*—Kibrom K Gebresilassie
(74) *Attorney, Agent, or Firm*—Woodcock Washburn LLP

(57) ABSTRACT

Attempts by drivers of a virtualized legacy computer game to communicate with nonexistent legacy game system hardware are converted into calls to actual hardware of the host computer game system. An access control list (ACL) restricting and/or reducing page permissions is used to explicitly forbid the drivers of the legacy computer game operating on the virtualized legacy computer game platform from writing to the MMIO addresses of the legacy computer game system. When the operating system of the virtualized legacy computer game platform attempts to touch its driver memory by writing to the MMIO addresses, the operating system of the host computer game system perceives a memory access violation, suspends the virtual machine implementing the virtualized computer game platform, and passes the intended write to an exception handler of the host operating system. The exception handler of the host operating system translates the attempted hardware access command into the command language of the host operating system and then returns control to the operating system of the virtualized legacy computer game platform. The legacy game is completely unaware of this address translation in that it sees only a successful hardware result and proceeds.

20 Claims, 8 Drawing Sheets

U.S. PATENT DOCUMENTS

2005/0091029 A1* 4/2005 Traut ............................ 703/27
2006/0026385 A1* 2/2006 Dinechin et al. ............ 711/210
2006/0031060 A1* 2/2006 Weissmann ................... 703/27
2007/0016895 A1* 1/2007 Tan ............................ 717/136

* cited by examiner

VIRTUAL OPERATING SYSTEM DEVICE COMMUNICATION RELYING ON MEMORY ACCESS VIOLATIONS

FIELD OF THE INVENTION

The invention is directed to systems and methods for virtualizing hardware devices in a virtual machine (VM) environment and, more particularly, the invention is directed to systems and methods for using memory access violations to instruct the host system to perform an address translation to enable access to actual memory mapped hardware devices of the host system.

BACKGROUND OF THE INVENTION

When updating hardware architectures of computer systems such as game consoles to implement faster, more feature rich hardware, developers are faced with the issue of backwards compatibility to the legacy computer system for application programs or games developed for the legacy computer system platform. In particular, it is commercially desirable that the updated hardware architecture support application programs or games developed for the legacy hardware architecture. However, if the updated hardware architecture differs substantially, or radically, from that of the legacy hardware architecture, architectural differences between the two systems may make it very difficult, or even impossible, for legacy application programs or games to operate on the new hardware architecture without substantial hardware modification and/or software patches. Since customers generally expect such backwards compatibility, a solution to these problems is critical to the success of the updated hardware architecture.

Recent advances in PC architecture and software emulation have provided hardware architectures for computers, even game consoles, that are powerful enough to enable the emulation of legacy application programs or games in software rather than hardware. Such software emulators translate the title instructions for the application program or game on the fly into device instructions understandable by the new hardware architecture. This software emulation approach is particularly useful for backwards compatibility for computer game consoles since the developer of the game console maintains control over both the hardware and software platforms and is quite familiar with the legacy games.

However, to enable emulation of the host hardware, computer game systems, such as Xbox, pose a particular problem. Unlike an operating system (OS) of a personal computer (PC), the operating system of a computer game system is generally not stored entirely within the console of the computer game system itself. Instead, many of the drivers and middleware layers are shipped on each and every game disc and statically linked in to ensure perfect compatibility between the game and the computer game system software. Unfortunately, this means that when the computer game platform for a legacy computer game system is virtualized using software emulation, the legacy games will continue to attempt to communicate with non-existent legacy computer game system hardware. For example, in the legacy Xbox computer game system, drivers from the game discs communicate with hardware devices by writing to memory-mapped device I/O (MMIO) addresses. However, once the legacy Xbox computer game system is virtualized using software emulation, these MMIO addresses are meaningless.

Accordingly, a technique is needed to enable the legacy computer games drivers to communicate with the hardware of the new host game system even when the legacy computer game system is virtualized using software emulation. The present invention addresses this need in the art.

SUMMARY OF THE INVENTION

The invention addressed the above-mentioned need in the art by converting attempts by drivers of a legacy computer game to communicate with the nonexistent legacy game system hardware into calls to actual hardware of the host computer game system. In accordance with the invention, an access control list (ACL) restricting and/or reducing page permissions (e.g. to read only) is used to explicitly forbid the drivers of the legacy computer game operating on the virtualized legacy computer game platform from writing to the MMIO addresses of the legacy computer game system. When the operating system of the virtualized legacy computer game platform attempts to touch its driver memory by writing to the MMIO addresses, the operating system of the host computer game system perceives a memory access violation, suspends the virtual machine implementing the virtualized computer game platform, and passes the intended write to an exception handler of the host operating system. The exception handler of the host operating system passes control to an emulator that translates the attempted hardware access command into the command language of the host operating system and performs the operation. The emulator exits and returns the translation results and control to the operating system of the virtualized legacy computer game platform. The legacy game is completely unaware of this address translation in that it sees only a successful hardware result and proceeds.

Those skilled in the art will appreciate that, while an exemplary embodiment of the invention is implemented in the Xbox computer game system available from Microsoft Corporation, any computer game console or other type of computer system in which a substantial part of the operating system or its drivers are provided on the game media or application program media could benefit from the memory access violation approach to device emulation used in accordance with the invention. Additional characteristics of the invention will be apparent to those skilled in the art based on the following detailed description.

BRIEF DESCRIPTION OF THE DRAWINGS

The systems and methods for converting attempts by drivers of a legacy computer game to communicate with the nonexistent legacy game system hardware into calls to actual hardware of the host computer game system in accordance with the invention are further described with reference to the accompanying drawings, in which.

DETAILED DESCRIPTION OF ILLUSTRATIVE EMBODIMENTS

Overview

Figure 1A:
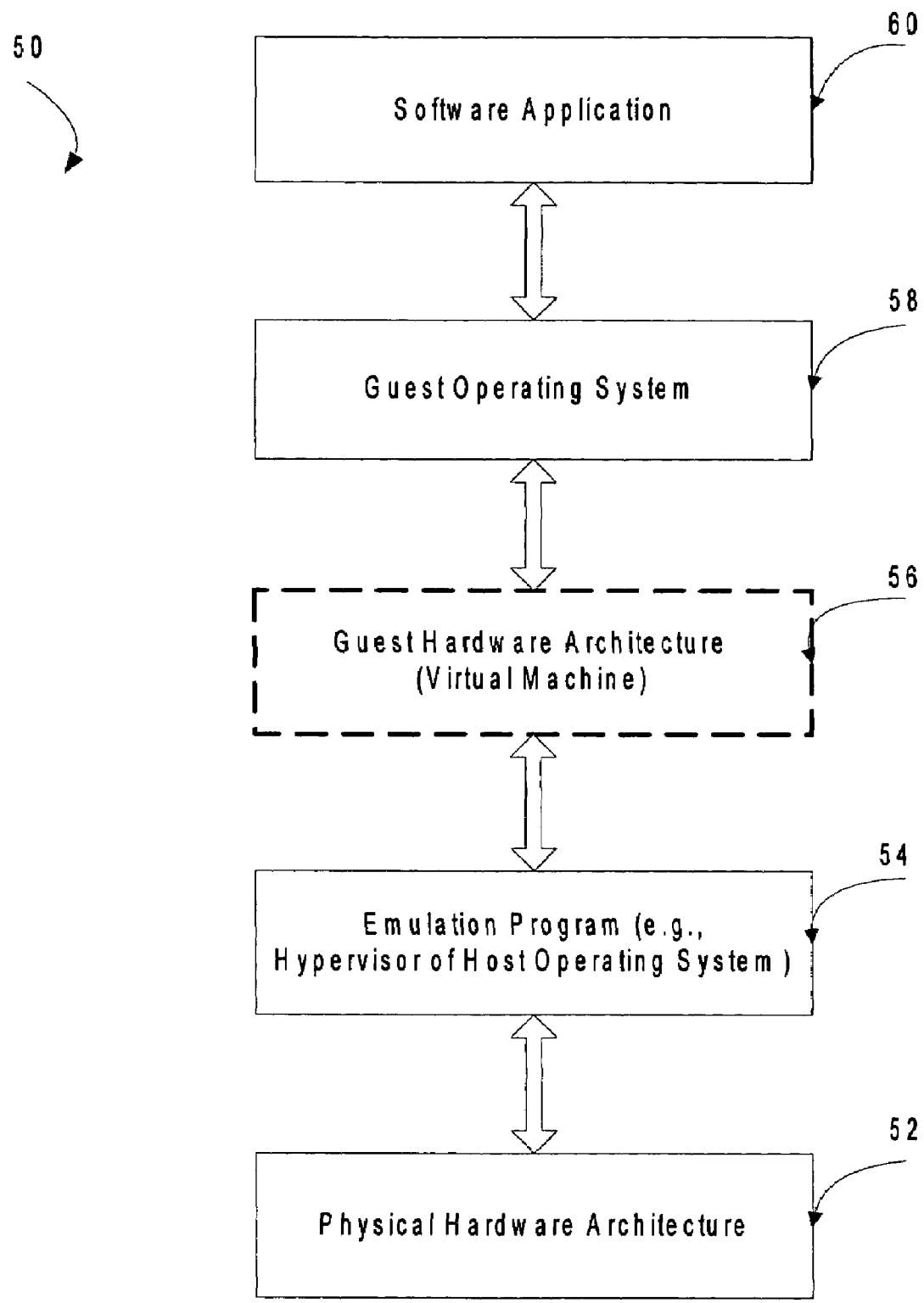
FIG. 1A is a block diagram representing the logical layering of the hardware and software architecture for an emulated operating environment in a computer system.

The invention converts attempts by drivers of a legacy computer game to communicate with the legacy game system hardware into calls to actual hardware of the host computer game system by using an access control list (ACL) to restrict and/or reduce page permissions (e.g., to read only) so as to explicitly forbid the drivers of the legacy computer game operating on the virtualized legacy computer game platform from writing to the MMIO addresses of the legacy computer game system. Then, when the operating system of the virtualized legacy computer game platform attempts to touch its driver memory by writing to the MMIO addresses, the operating system of the host computer game system perceives a memory access violation, suspends the virtual machine implementing the virtualized computer game platform, and passes the intended write to an exception handler of the host operating system. The exception handler of the host operating system passes control to an emulator that translates the attempted hardware access command into the command language of the host operating system and performs the operation. The emulator exits and returns the translation results and control to the operating system of the virtualized legacy computer game platform. The legacy game is completely unaware of this address translation in that it sees only a successful hardware result and proceeds.

Other more detailed aspects of the invention are described below, but first, the following description provides a general overview of and some common vocabulary for virtual machines, emulators, and associated terminology as the terms have come to be known in connection with operating systems and host processor ("CPU") virtualization techniques. In doing so, a set of vocabulary is set forth that one of ordinary skill in the art may find useful for the description that follows of the apparatus, systems and methods for providing virtual operating system device communication using memory access violations in accordance with the techniques of the invention.

Overview of Virtual Machines

Computers include general purpose central processing units (CPUs) or "processors" that are designed to execute a specific set of system instructions. A group of processors that have similar architecture or design specifications may be considered to be members of the same processor family. Examples of current processor families include the Motorola 680X0 processor family, manufactured by International Business Machines (IBM) or Motorola, Inc. of Phoenix, Ariz.; the Intel 80X86 processor family, manufactured by Intel Corporation of Sunnyvale, Calif.; and the PowerPC processor family, which is manufactured by Motorola, Inc. and used in computers manufactured by Apple Computer, Inc. of Cupertino, Calif. Although a group of processors may be in the same family because of their similar architecture and design considerations, processors may vary widely within a family according to their clock speed and other performance parameters.

Each family of microprocessors executes instructions that are unique to the processor family. The collective set of instructions that a processor or family of processors can execute is known as the processor's instruction set. As an example, the instruction set used by the Intel 80X86 processor family is incompatible with the instruction set used by the PowerPC processor family. The Intel 80X86 instruction set is based on the Complex Instruction Set Computer (CISC) format, while the Motorola PowerPC instruction set is based on the Reduced Instruction Set Computer (RISC) format. CISC processors use a large number of instructions, some of which can perform rather complicated functions, but which generally require many clock cycles to execute. RISC processors, on the other hand, use a smaller number of available instructions to perform a simpler set of functions that are executed at a much higher rate.

The uniqueness of the processor family among computer systems also typically results in incompatibility among the other elements of hardware architecture of the computer systems. A computer system manufactured with a processor from the Intel 80X86 processor family will have a hardware architecture that is different from the hardware architecture of a computer system manufactured with a processor from the PowerPC processor family. Because of the uniqueness of the processor instruction set and a computer system's hardware architecture, application software programs are typically written to run on a particular computer system running a particular operating system.

Generally speaking, computer manufacturers try to maximize their market share by having more rather than fewer applications run on the microprocessor family associated with the computer manufacturers' product line. To expand the number of operating systems and application programs that can run on a computer system, a field of technology has developed in which a given computer having one type of CPU, called a host, will include a virtualizer program that allows the host computer to emulate the instructions of an unrelated type of CPU, called a guest. Thus, the host computer will execute an application that will cause one or more host instructions to be called in response to a given guest instruction, and in this way the host computer can both run software designed for its own hardware architecture and software written for computers having an unrelated hardware architecture.

As a more specific example, a computer system manufactured by Apple Computer, for example, may run operating systems and programs written for PC-based computer systems. It may also be possible to use virtualizer programs to execute concurrently on a single CPU multiple incompatible operating systems. In this latter arrangement, although each operating system is incompatible with the other, virtualizer programs can host each of the several operating systems and thereby allowing the otherwise incompatible operating systems to run concurrently on the same host computer system.

When a guest computer system is emulated on a host computer system, the guest computer system is said to be a "virtual machine" as the guest computer system only exists in the host computer system as a pure software representation of the operation of one specific hardware architecture. Thus, an operating system running inside virtual machine software such as Microsoft's Virtual PC may be referred to as a "guest" and/or a "virtual machine," while the operating system running the virtual machine software may be referred to as the "host." Similarly, the operating system in a legacy game system running inside virtual machine or emulation software inside a new game system may be referred to as the "guest," while the operating system of the new game system running the virtual machine or emulation software may be referred to as the "host." The terms virtualizer, emulator, direct-executor, virtual machine, and processor emulation are sometimes used interchangeably to denote the ability to mimic or emulate the hardware architecture of an entire computer system using one or several approaches known and appreciated by those of skill in the art. Moreover, all uses of the term "emulation" in any form is intended to convey this broad meaning and is not intended to distinguish between instruction execution concepts of emulation versus direct-execution of operating system instructions in the virtual machine. Thus, for example, Virtual PC software available from Microsoft Corporation "emulates" (by instruction execution emulation and/or direct execution) an entire computer that includes an Intel 80X86 Pentium processor and various motherboard components and cards, and the operation of these components is "emulated" in the virtual machine that is being run on the host machine. A virtualizer program executing on the operating system software and hardware architecture of the host computer, such as a computer system having a PowerPC processor, mimics the operation of the entire guest computer system.

The general case of virtualization allows one processor architecture to run OSes and programs from other processor architectures (e.g., PowerPC Mac programs on x86 Windows, and vice versa), but an important special case is when the underlying processor architectures are the same (run various versions of x86 Linux or different versions of x86 Windows on x86). In this latter case, there is the potential to execute the Guest OS and its applications more efficiently since the underlying instruction set is the same. In such a case, the guest instructions are allowed to execute directly on the processor without losing control or leaving the system open to attack (i.e., the Guest OS is sandboxed). This is where the separation of privileged versus non-privileged and the techniques for controlling access to memory comes into play. For virtualization where there is an architectural mismatch (PowerPC<->x86), two approaches could be used: instruction-by-instruction emulation (relatively slow) or translation from the guest instruction set to the native instruction set (more efficient, but uses the translation step). If instruction emulation is used, then it is relatively easy to make the environment robust; however, if translation is used, then it maps back to the special case where the processor architectures are the same.

In accordance with the invention, the guest operating system is virtualized and thus an exemplary scenario in accordance with the invention would be emulation of a Windows95®, Windows98®, Windows 3.1, or Windows NT 4.0 operating system on a Virtual Server or an Xbox operating system on an Xbox game console available from Microsoft Corporation. In various embodiments, the invention thus describes systems and methods for controlling guest access to some or all of the underlying physical resources (memory, devices, etc.) of the host computer.

The virtualizer program acts as the interchange between the hardware architecture of the host machine and the instructions transmitted by the software (e.g., operating systems, applications, etc.) running within the emulated environment. This virtualizer program may be a host operating system (HOS), which is an operating system running directly on the physical computer hardware (and which may comprise a hypervisor). Alternately, the emulated environment might also be a virtual machine monitor (VMM) which is a software layer that runs directly above the hardware, perhaps running side-by-side and working in conjunction with the host operating system, and which can virtualize all the resources of the host machine (as well as certain virtual resources) by exposing interfaces that are the same as the hardware the VMM is virtualizing. This virtualization enables the virtualizer (as well as the host computer system itself) to go unnoticed by operating system layers running above it.

Processor emulation thus enables a guest operating system to execute on a virtual machine created by a virtualizer running on a host computer system comprising both physical hardware and a host operating system.

From a conceptual perspective, computer systems generally comprise one or more layers of software running on a foundational layer of hardware. This layering is done for reasons of abstraction. By defining the interface for a given layer of software, that layer can be implemented differently by other layers above it. In a well-designed computer system, each layer only knows about (and only relies upon) the immediate layer beneath it. This allows a layer or a "stack" (multiple adjoining layers) to be replaced without negatively impacting the layers above said layer or stack. For example, software applications (upper layers) typically rely on lower levels of the operating system (lower layers) to write files to some form of permanent storage, and these applications do not need to understand the difference between writing data to a floppy disk, a hard drive, or a network folder. If this lower layer is replaced with new operating system components for writing files, the operation of the upper layer software applications remains unaffected.

The flexibility of layered software allows a virtual machine (VM) to present a virtual hardware layer that is in fact another software layer. In this way, a VM can create the illusion for the software layers above it that the software layers are running on their own private computer system, and thus VMs can allow multiple "guest systems" to run concurrently on a single "host system." This level of abstraction is represented by the illustration of FIG. 1A.

FIG. 1A is a diagram representing the logical layering of the hardware and software architecture for an emulated operating environment in a computer system. In the figure, an emulation program 54 runs directly or indirectly on the physical hardware architecture 52. Emulation program 54 may be (a) a virtual machine monitor that runs alongside a host operating system, (b) a specialized host operating system having native emulation capabilities, or (c) a host operating system with a hypervisor component wherein the hypervisor component performs the emulation. Emulation program 54 emulates a guest hardware architecture 56 (shown as broken lines to illustrate the fact that this component is the "virtual machine," that is, hardware that does not actually exist but is instead emulated by said emulation program 54). A guest operating system 58 executes on the guest hardware architecture 56, and software application 60 runs on the guest operating system 58. In the emulated operating environment of FIG. 1A—and because of the operation of emulation program 54—software application 60 may run in computer system 50 even if software application 60 is designed to run on an operating system that is generally incompatible with the host operating system and hardware architecture 52.

Figure 1B:
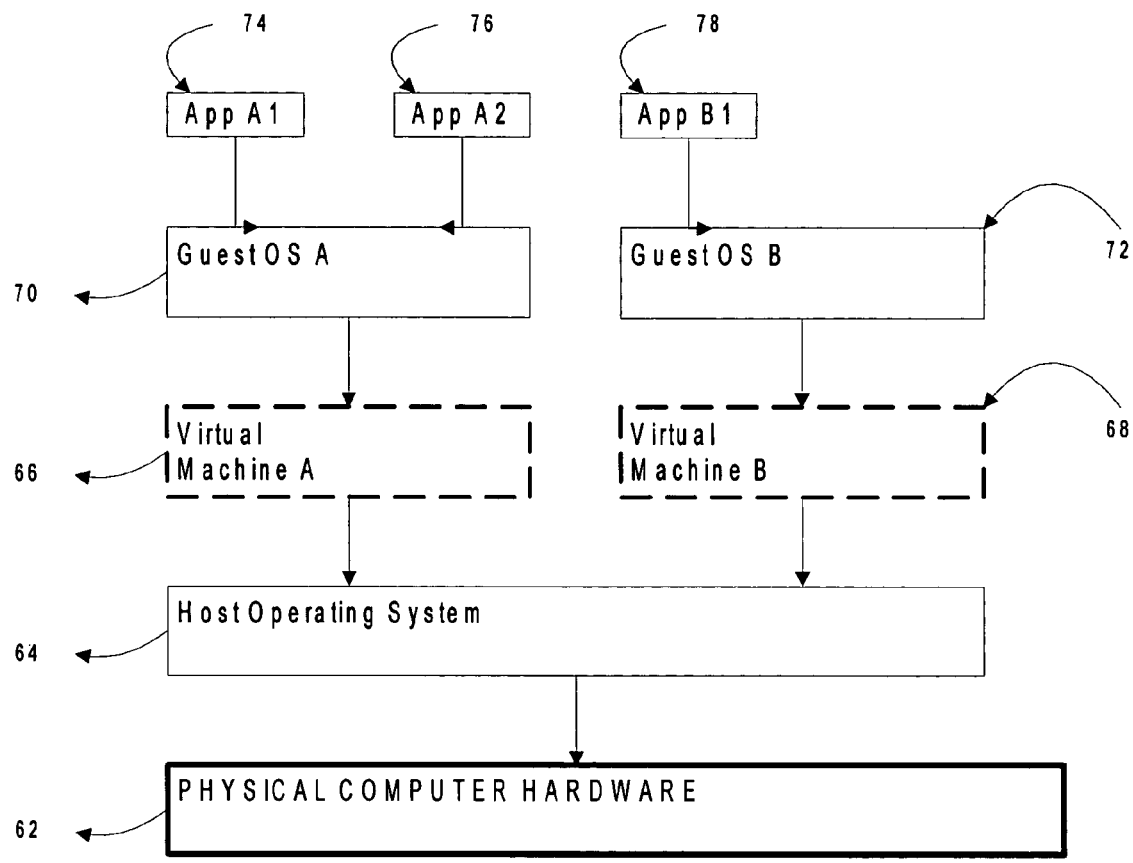
FIG. 1B is a block diagram representing a virtualized computing system wherein the emulation is performed by the host operating system (either directly or via a hypervisor)

FIG. 1B illustrates a virtualized computing system comprising a host operating system software layer 64 running directly above physical computer hardware 62 where the host operating system (host OS) 64 provides access to the resources of the physical computer hardware 62 by exposing interfaces that are the same as the hardware the host OS is emulating (or "virtualizing")—which, in turn, enables the host OS 64 to go unnoticed by operating system layers running above it. Again, to perform the emulation the host OS 64 may be a specially designed operating system with native emulations capabilities or, alternately, it may be a standard operating system with an incorporated hypervisor component for performing the emulation (not shown).

As shown in FIG. 1B, above the host OS 64 are two virtual machine (VM) implementations, VM A 66, which may be, for example, a virtualized Intel 386 processor, and VM B 68, which may be, for example, a virtualized version of one of the Motorola 680X0 family of processors. Above each VM 66 and 68 are guest operating systems (guest OSes) A 70 and B 72 respectively. Running above guest OS A 70 are two applications, application A1 74 and application A2 76, and running above guest OS B 72 is application B1 78.

In regard to FIG. 1B, it is important to note that VM A 66 and VM B 68 (which are shown in broken lines) are virtualized computer hardware representations that exist only as software constructs and which are made possible due to the execution of specialized emulation software(s) that not only presents VM A 66 and VM B 68 to Guest OS A 70 and Guest OS B 72 respectively, but which also performs all of the software steps necessary for Guest OS A 70 and Guest OS B 72 to indirectly interact with the real physical computer hardware 62.

Figure 1C:
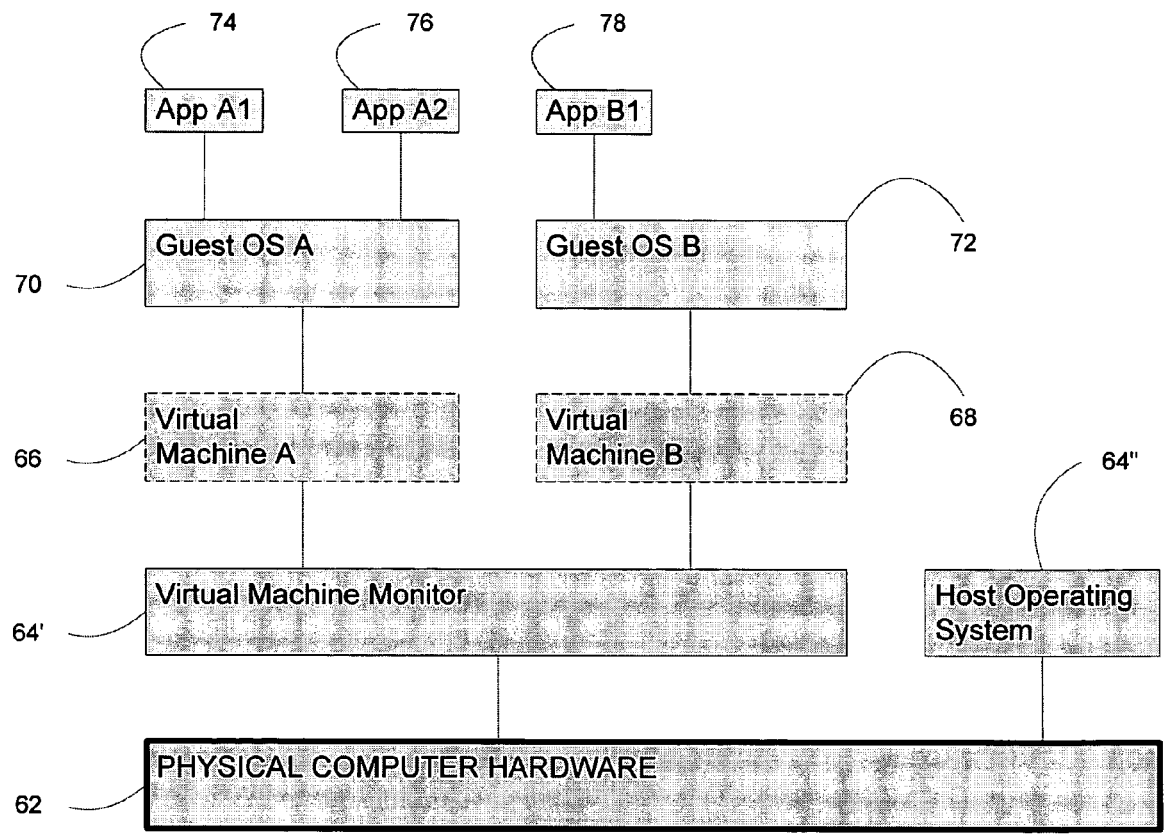
FIG. 1C is a block diagram representing an alternative virtualized computing system wherein the emulation is performed by a virtual machine monitor running side-by-side with a host operating system.

FIG. 1C illustrates an alternative virtualized computing system wherein the emulation is performed by a virtual machine monitor (VMM) 64'0 running alongside the host operating system 64". For certain embodiments the VMM 64' may be an application running above the host operating system 64" and interacting with the physical computer hardware 62 only through the host operating system 64". In other embodiments, and as shown in FIG. 1C, the VMM 64' may instead comprise a partially independent software system that on some levels interacts indirectly with the computer hardware 62 via the host operating system 64" but on other levels the VMM 64' interacts directly with the computer hardware 62 (similar to the way the host operating system interacts directly with the computer hardware). And in yet other embodiments, the VMM 64' may comprise a fully independent software system that on all levels interacts directly with the computer hardware 62 (similar to the way the host operating system 64" interacts directly with the computer hardware 62) without utilizing the host operating system 64" (although still interacting with said host operating system 64" insofar as coordinating use of the computer hardware 62 and avoiding conflicts and the like).

All of these variations for implementing the virtual machine are anticipated to form alternative embodiments of the invention as described herein, and nothing herein should be interpreted as limiting the invention to any particular emulation embodiment. In addition, any reference to interaction between applications 74, 76, and 78 via VM A 66 and/or VM B 68 respectively (presumably in a hardware emulation scenario) should be interpreted to be in fact an interaction between the applications 74, 76, and 78 and the virtualizer that has created the virtualization. Likewise, any reference to interaction between applications VM A 66 and/or VM B 68 with the host operating system 64 and/or the computer hardware 62 (presumably to execute computer instructions directly or indirectly on the computer hardware 62) should be interpreted to be in fact an interaction between the virtualizer that has created the virtualization and the host operating system 64 and/or the computer hardware 62 as appropriate.

Virtual OS Device Communication Using Memory Access Violations

The present invention relates to features of a system that uses a software emulator to virtualize a legacy game system platform, such as Xbox, on a host game system platform that is an upgrade of the legacy game system platform. The software emulator enables the host game system platform to run legacy games in a seamless fashion. As noted above, the present invention addresses the problems that occur when the drivers of such legacy games attempt to access memory mapped I/O (MMIO) devices that are no longer present (or at least not present at the same location) in the host game system platform. The inventive solution to these problems will be described below with respect to FIGS. 2-4.

In accordance with the invention, when the media loader of the host game system console receives media containing a legacy computer game and is asked by the operating system of the host game system to boot the legacy computer game, the media loader instead invokes a software emulator that provides backwards compatibility for the operation of the legacy computer game. The software emulator loads and runs the legacy computer game as a standard game with the same rights and restrictions as any native computer game of the host game system. At boot time, the software emulator requests that two physical memory chunks be reserved: a 64 MB segment to host the virtualized legacy computer game, and a 64 MB segment to provide a conduit between the virtual machine that implements the legacy computer game and host computer game system.

Figure 2:
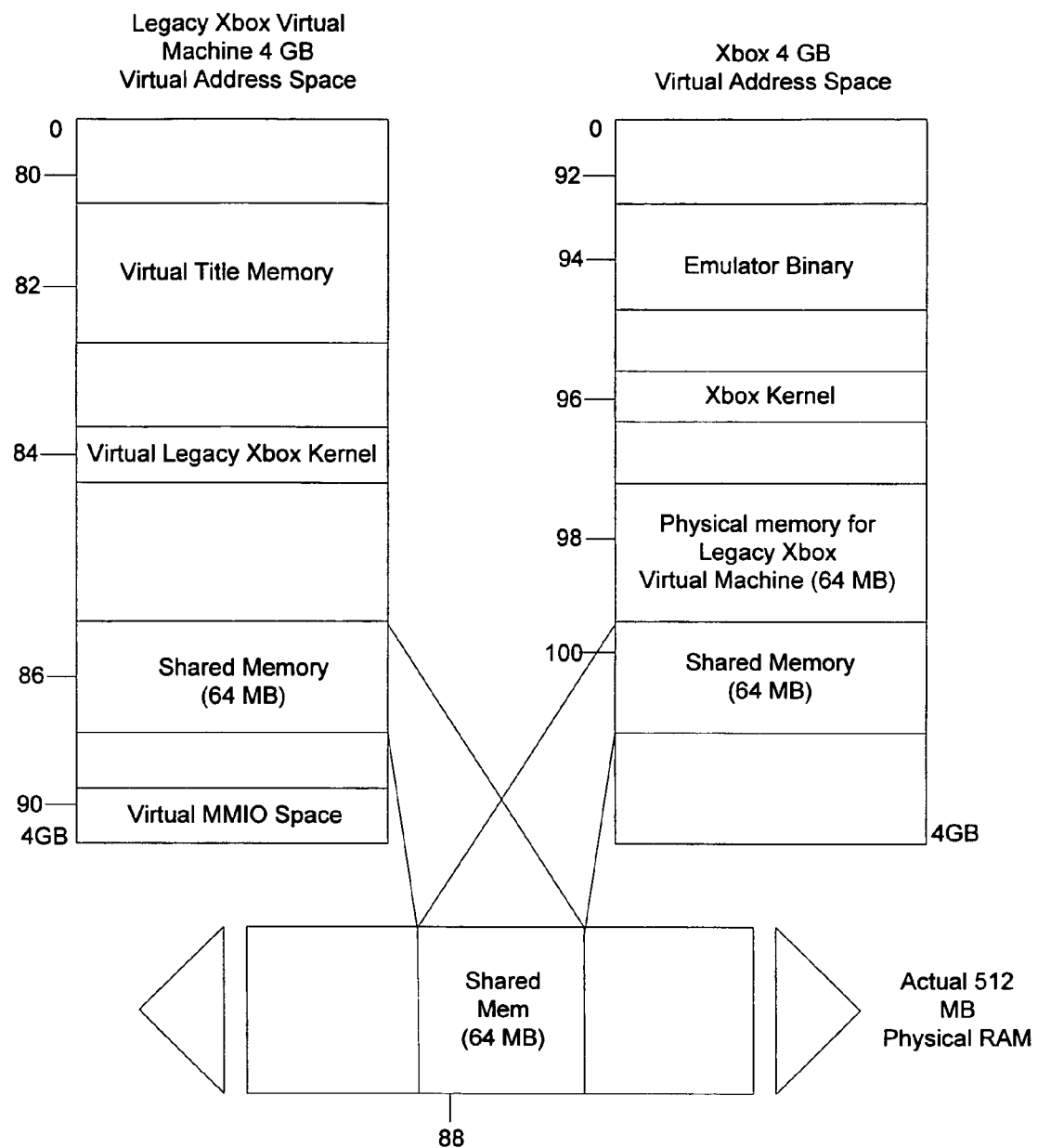
FIG. 2 illustrates the relationship between the virtual memory of the legacy game system implemented in a virtual machine and the virtual memory of the host game system.

FIG. 2 illustrates the relationship between the virtual memory of the legacy game system implemented in a virtual machine and the virtual memory of the host game system. In this example, the legacy game system is assumed to be Xbox, available from Microsoft Corporation. As illustrated, the legacy Xbox game system is implemented in a virtual machine environment and assumes a virtual address space 80 of 4 GB is available. As illustrated, the legacy 4 GB virtual address space is assumed by the legacy Xbox game system to have a section of memory 82 dedicated to the virtual title of the inserted legacy game, a memory 84 dedicated to the virtual legacy Kbox kernel, a 64 MB shared memory 86 that maps directly to a 64 MB shared memory in a physical RAM 88 of the host game system, and a virtual MMIO address space 90 in the upper region of the 4 GB virtual address space. Those skilled in the art will appreciate that the MMIO address space 90 in the legacy Xbox game system contains pointers to the actual hardware devices that are called by the drivers of the Xbox game system console's operating system. In accordance with the invention, the virtual address space accessed by the legacy Xbox game as implemented in the virtual machine environment is configured the same as the virtual address space in the native legacy Xbox game system environment, thus tricking the legacy Xbox game into thinking that it is operating in the native legacy Xbox game system environment.

Figure 3:
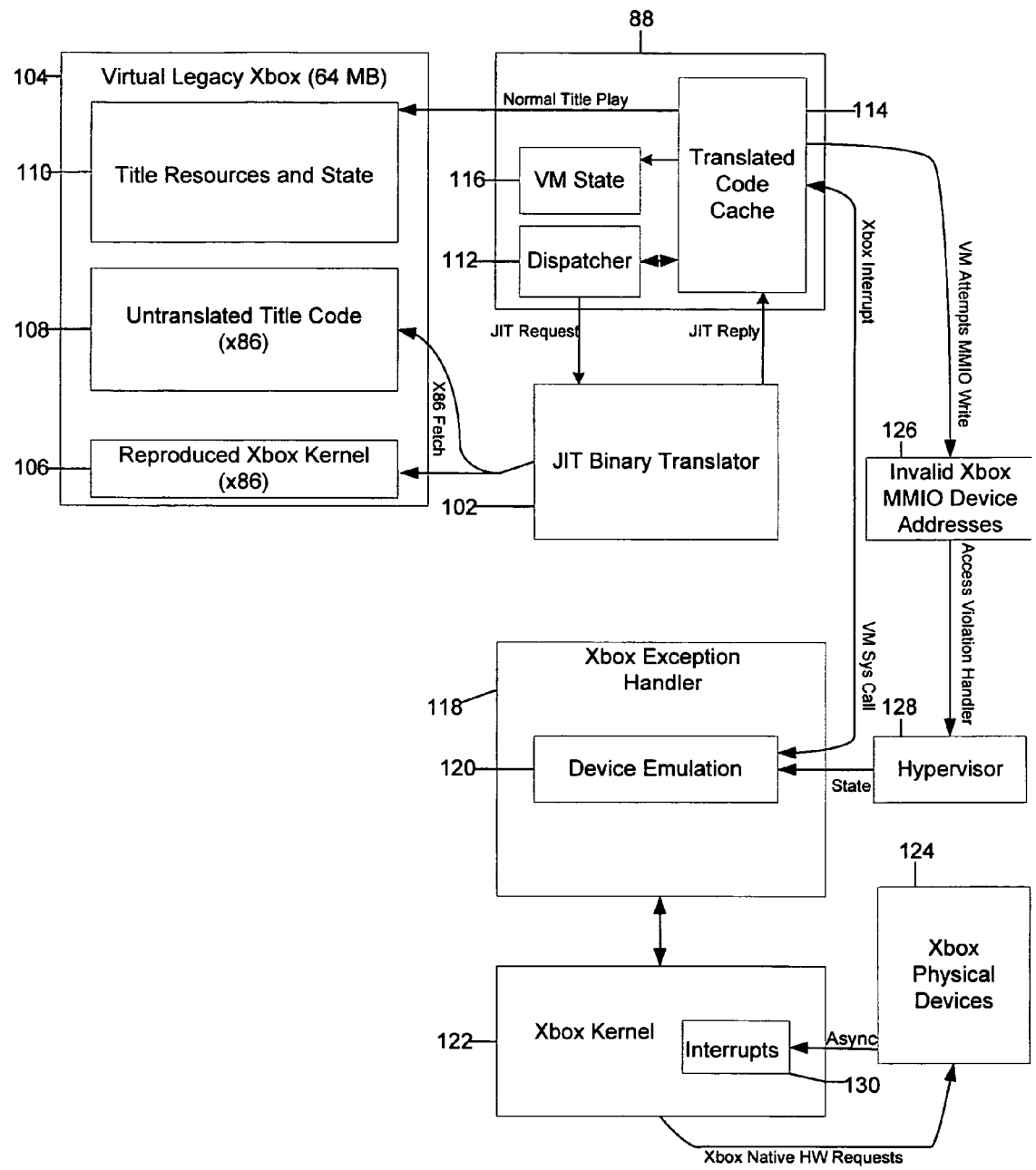
FIG. 3 illustrates a system for converting attempts by the virtualized legacy game system to communicate with hardware devices into the actual memory addresses of the hardware of the host game system.

On the other hand, the virtual address space 92 of the native host Xbox game system is characterized by an emulator binary memory 94, the native host Xbox kernel 96, and a 64 MB physical memory segment 98 that hosts the legacy Xbox virtual machine. A 64 MB shared memory 100 is also provided that maps directly to the 64 MB shared memory in the physical RAM 88 of the native host Xbox game system. As will be explained in more detail below with respect to FIG. 3, a recreated copy of the x86 Xbox kernel 84 as well as the x86 title binaries originally passed to the game loader are loaded in the 64 MB space 98 reserved to the virtual Xbox game system. In the 64 MB shared memory space 100, on the other hand, the native host Xbox game system loads its dispatcher program, loads certain hand-optimized "glue" functions, and creates structures for virtual machine (VM) state and the translated code cache (FIG. 3). These functions are shared with the legacy Xbox game running on the virtual machine via shared memory 88, which is actually a physically shared section of RAM accessible to both the virtual machine implementing the legacy Xbox and the emulator engine of the native host Xbox operating system.

FIG. 3 illustrates a system in accordance with the invention for converting attempts by the virtualized legacy game system to communicate with hardware devices into the actual memory addresses of the hardware of the native host game system. As illustrated, the backwards compatibility system of the invention that implements this functionality includes four major components:

- a just-in-time (JIT) binary translator 102 that provides just-in-time binary translation of x86 code of the legacy Xbox game system to PPC code or other processor code of the native host Xbox game system;
- a legacy Xbox virtual machine (VM) 104 that recreates most of the legacy Xbox environment in reproduced x86 Xbox kernel 106 and untranslated title code store 108 and the legacy title environment in stored title resources and state store 110;
- a shared memory 88 that permits communication between the backwards compatibility portion of the operating system of the native host Xbox game system and the VM 104 and hosts the dispatcher 112 and the translated code cache 114 while tracking VM state 116; and
- a hypervisor 128 and Xbox exception handler 118 that together provide exception handling while device emulation 120 further emulates the hardware devices of the native host Xbox system on the native Xbox kernel 122 for use by the Xbox VM 104 while running a legacy Xbox game.

As will be explained below, the system of the invention permits the legacy Xbox game's device drivers to access the native host Xbox system's physical devices 124 by generating memory access violations based on attempts by the legacy Xbox game's device drivers to access invalid legacy Xbox MMIO device addresses at 126 and sending memory access violations to hypervisor 128 for processing.

After initialization of a legacy Xbox game in the legacy Xbox virtual machine 104, the operating system of the native host Xbox game system passes control to the dispatcher 112, which resides in the shared memory space 88. Fundamentally, the dispatcher 112 directs code execution for the virtualized legacy Xbox game. It maintains a mapping between every x86 function referenced in the x86 space and an equivalent, translated PPC (or other host processor) function in the translated code cache 114. The job of the dispatcher 112 is to chain translated PPC (or other host processor) functions together in the sequence expected by the virtualized x86 legacy Xbox title. The first task of dispatcher 112 is to simulate booting the legacy x86 Xbox kernel 106 and legacy x86 title in title memory 110. If the host OS of the native host Xbox game system performs no significant pre-translation of emulated binaries, at first the dispatcher 112 has no cached PPC (or other host processor) equivalents for the requested x86 functions. To fill these gaps, the dispatcher 112 calls to the JIT binary translator 102 for just-in-time function translation.

Those skilled in the art will appreciate that translating x86 code to PPC (Power PC) code, for example, is problematic in some respects. For one thing, the x86 ISA contains several complex functions with no simple PPC ISA equivalents. For another, the PPC processor of the native host Xbox game system is configured to interpret data as Big-Endian, whereas legacy Xbox titles expect Little-Endian interpretation. In addition, naive translation of legacy Xbox x86 code can result in a huge magnification of instructions and cache misses on the native host Xbox system hardware. As explained in copending U.S. patent application Ser. No. 11/128,699, to Tan, also assigned to the present assignee Microsoft Corporation, the JIT binary translator 102 may be designed to take steps to mitigate this "translation bloat." The details regarding such JIT translation techniques may be found in that patent application, the contents of which are incorporated herein by reference.

After translation, the desired PPC function corresponding to the one or more x86 instructions in the legacy Xbox command sequence executes, operating on resources within the 4 GB memory space of the legacy Xbox virtual machine (104). When the legacy Xbox virtual machine completes processing of the desired PPC function, control jumps back to the dispatcher 112 by way of an interrupt with a request for the next x86 function and the entire JIT binary translation cycle begins again. Since computer games are generally coded as enormous loops, after the initial few seconds of execution, most x86 functions have been translated and are present in the translated code cache 114 as optimized PPC code (or other processor code if the native host Xbox game system uses a different processor).

However, device requests and system calls by the legacy Xbox game are the exceptions to this rule. The virtualized legacy Xbox game frequently wants to speak to the legacy Xbox hardware but is unaware that it is operating on the platform of the native host Xbox game system. As with many operating systems, in the legacy Xbox operating system, games communicated with most devices by writing to well-known Memory Mapped I/O (MMIO) locations. As illustrated in FIG. 2, these MMIO locations were, in the case of the Xbox operating system, in the upper region 90 of the 4 GB virtual memory space. The present invention uses an access control list (ACL) to restrict and/or reduce page permissions (e.g., to read only or to no read or write) such that the virtual machine 104 implementing the legacy Xbox game lacks read and write privileges to these MMIO addresses in memory 90. As a result, when the legacy Xbox game running in the virtual machine 104 attempts to access its expected device memory 90, the host Xbox operating system detects invalid Xbox MMIO device addresses at 126 and halts the thread. A memory access violation message is sent to the hypervisor 128 which, in turn, passes VM state information to the Xbox exception handler 118 to resolve the memory access violation.

The memory access violation and any intentional system calls forwarded to the Xbox exception handler 118 by the hypervisor 128 are processed to determine the intended target device using the MMIO address provided in the MMIO write from the legacy Xbox game. Since memory access violations often indicate a virtual device request, the Xbox exception handler 118 may simply check the virtual machine state provided by the hypervisor 128 (from VM state register 116) and determine the intended target device. Control is then given to an appropriate Xbox device emulator 120 in the Xbox exception handler 118, which translates and relays the request of the virtual machine 104 to the appropriate functions of the Xbox kernel 122 or to native host Xbox libraries. Since it cannot be assumed that the native host Xbox system shares any hardware with the legacy Xbox system, simple instruction forwarding is not an option. Of course, if hardware is shared, then instruction forwarding may be used.

As illustrated in FIG. 3, some native hardware requests to Xbox physical devices 124, such as hard drive I/O, produce asynchronous callbacks in the form of device interrupts 130. When the native host Xbox kernel 122 receives such an interrupt, it halts the JIT binary translator 102 and supplies the interrupt data to an appropriate Xbox device emulator 120 in the Xbox exception handler 118 that, in turn, translates the reply and stores it in the shared memory space 88. Control is then returned to the virtual machine 104 by simulating a legacy Xbox interrupt so that the virtual machine 104 may handle the new data.

Figure 4:
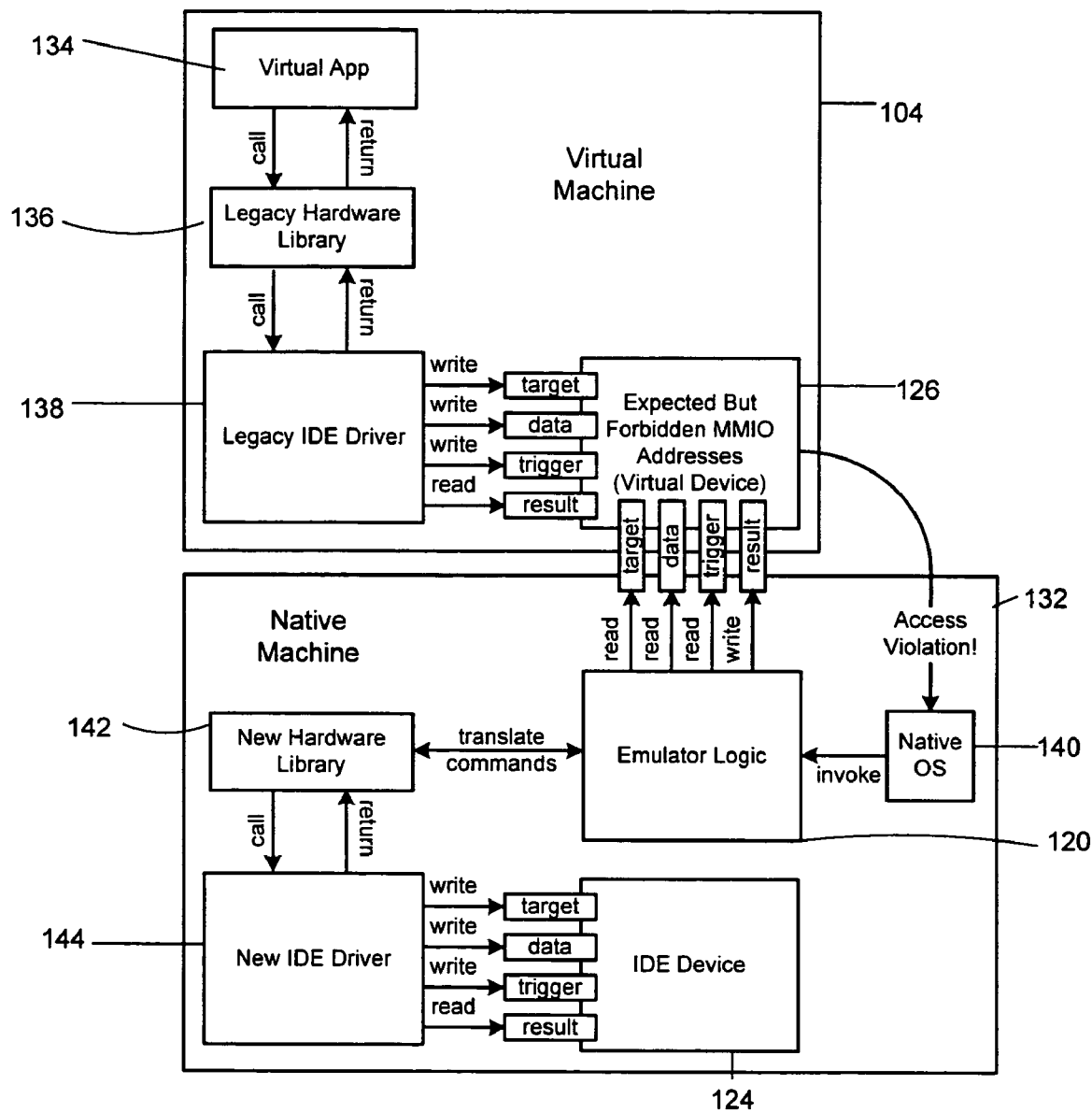
FIG. 4 illustrates a sample embodiment of the invention for enabling the virtualized legacy game system to access IDE controller hardware of the host game system.

FIG. 4 illustrates a sample embodiment of the invention for enabling the virtualized legacy Xbox game system to access integrated drive electronics (IDE) controller hardware of the native host Xbox game system in accordance with the invention. The virtual machine 104 implementing the legacy Xbox game runs on the hypervisor 128 of the native host Xbox machine 132. A virtual application (legacy game) 134 makes a call to IDE controller hardware by making a standard API call to the legacy hardware library 136. Legacy hardware library 136, in turn, calls the legacy IDE driver 138 typically provided from the media containing the virtual application 134. The legacy IDE driver 138, in turn, writes to the MMIO addresses of the expected hardware. The write to the virtual MMIO address fails since the page permissions to the virtual MMIO addresses have been denied. As a result, a memory access violation is identified at 126 to the native operating system 140 of the native Xbox machine 132. The memory access violation is provided to the emulator logic of the device emulator 120 of the Xbox exception handler 118 of the native Xbox machine 132 for resolution. In turn, device emulator 120 calls the new hardware library 142 that, in turn, calls the new hardware driver, which translates the MMIO address into the corresponding commands to the new IDE driver 144. These commands are then provided to the new IDE driver 144 of the native Xbox machine 132. The corresponding Xbox IDE physical device 124 is then accessed and the resulting data is accessed in a conventional manner. Those skilled in the art will appreciated that, for certain hardware requests, such as hard drive I/O, device emulator 120 may produce an asynchronous callback to virtual machine 104 in the form of a device interrupt.

Thus, the invention provides a mechanism whereby a program or game running in a virtual machine environment may cause memory access violations to be generated when attempts are made to access legacy hardware that may no longer exist. The memory access violations are then resolved by the host operating system in a conventional manner to obtain the requested data that is, in turn, provided to the virtualized program or game that made the initial attempt to access legacy hardware. Those skilled in the art will appreciate that such techniques may be extended to all sorts of applications, not just game systems. Moreover, the techniques of the invention may be used to provide backwards compatibility to other computer systems and game consoles that accept application programs or computer games on inserted media.

Exemplary Networked and Distributed Environments

Although an exemplary embodiment of the invention may be implemented in connection with the Xbox game system architecture, one of ordinary skill in the art can appreciate that the invention can be implemented in connection with any suitable host computer or other client or server device, which can be deployed as part of a computer network, or in a distributed computing environment. In this regard, the invention pertains to any computer system or environment having any number of memory or storage units, and any number of applications and processes occurring across any number of storage units or volumes, which may be used in connection with virtualizing a guest OS in accordance with the invention. The invention may apply to an environment with server computers and client computers deployed in a network environment or distributed computing environment, having remote or local storage. The invention may also be applied to standalone computing devices, having programming language functionality, interpretation and execution capabilities for generating, receiving and transmitting information in connection with remote or local services.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes of the invention.

Figure 5A:
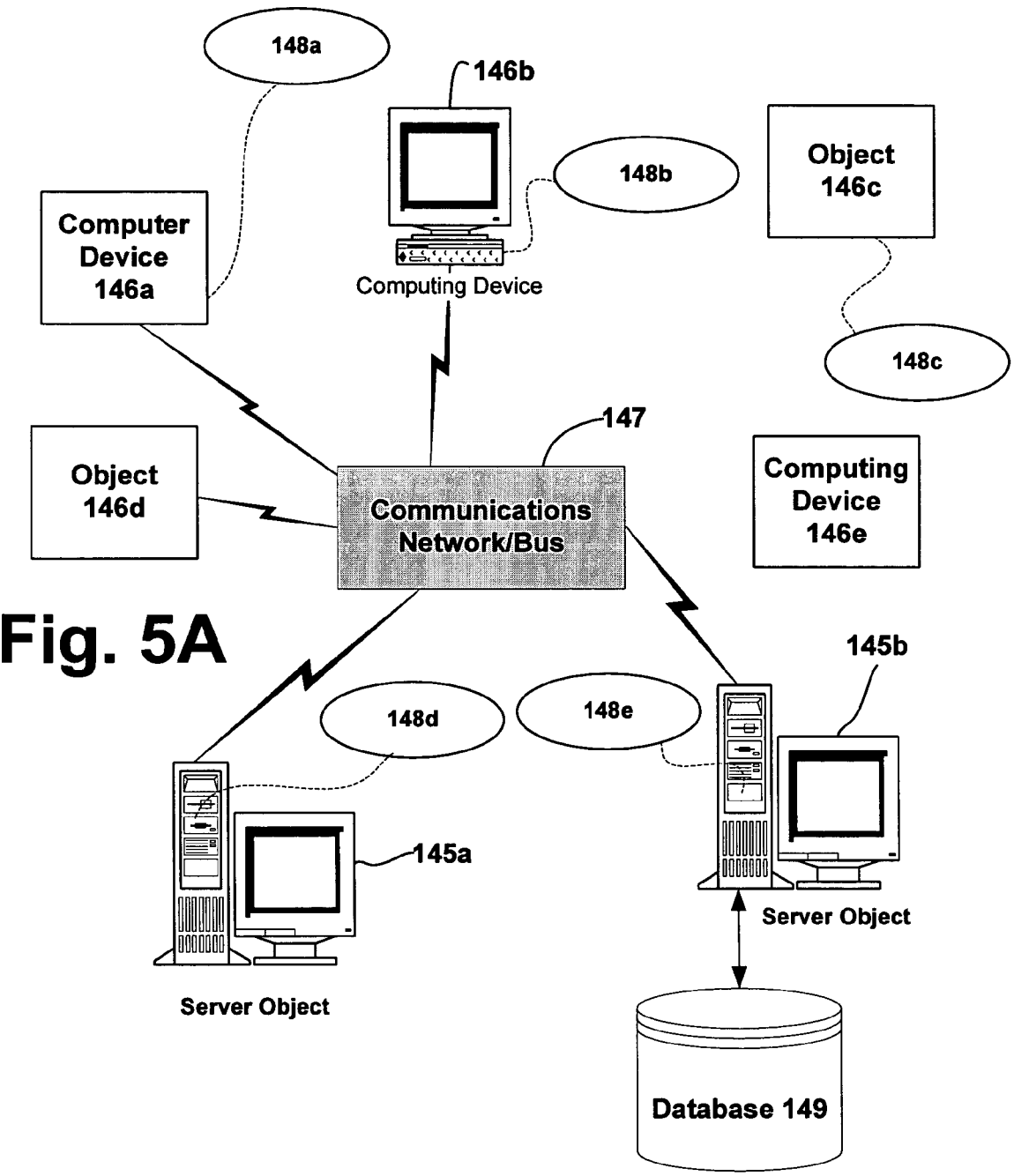
FIG. 5A is a block diagram representing an exemplary network environment having a variety of computing devices in which the invention may be implemented.

FIG. 5A provides a schematic diagram of an exemplary networked or distributed computing environment. The distributed computing environment comprises computing objects 145*a*, 145*b*, etc. and computing objects or devices 146*a*, 146*b*, 146*c*, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 147. This network may itself comprise other computing objects and computing devices that provide services to the system of FIG. 5A, and may itself represent multiple interconnected networks. In accordance with an aspect of the invention, each object 145*a*, 145*b*, etc. or 146*a*, 146*b*, 146*c*, etc. may contain an application that might make use of an API, or other object, software, firmware and/or hardware, to request use of the virtualization processes of the invention.

It can also be appreciated that an object, such as 146*c*, may be hosted on another computing device 145*a*, 145*b*, etc. or 146*a*, 146*b*, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the virtualization processes of the invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which make use of the virtualized services in accordance with the invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 5A, computers 146a, 146b, etc. can be thought of as clients and computers 145a, 145b, etc. can be thought of as the server where server 145a, 145b, etc. maintains the data that is then replicated in the client computers 146a, 146b, etc., although any computer can be considered a client, a server, or both, depending on the circumstances. Any of these computing devices may be processing data or requesting services or tasks that may implicate an implementation of the virtualization processes of the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to making use of the virtualized architecture(s) of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

FIG. 5A illustrates an exemplary networked or distributed environment, with a server in communication with client computers via a network/bus, in which the invention may be employed. In more detail, a number of servers 145a, 145b, etc., are interconnected via a communications network/bus 147, which may be a LAN, WAN, intranet, the Internet, etc., with a number of client or remote computing devices 146a, 146b, 146c, 146d, 146e, etc., such as a portable computer, handheld computer, thin client, networked appliance, or other device, such as a VCR, TV, oven, light, heater and the like. It is thus contemplated that the invention may apply to any computing device in connection with which it is desirable to implement guest interfaces and operating systems in accordance with the invention.

In a network environment in which the communications network/bus 147 is the Internet, for example, the servers 145a, 145b, etc. can be Web servers with which the clients 146a, 146b, 146c, 146d, 146e, etc. communicate via any of a number of known protocols such as HTTP. Servers 145a, 145b, etc. may also serve as clients 146a, 146b, 146c, 146d, 146e, etc., as may be characteristic of a distributed computing environment.

Communications may be wired or wireless, where appropriate. Client devices 146a, 146b, 146c, 146d, 146e, etc. may or may not communicate via communications network/bus 147, and may have independent communications associated therewith. For example, in the case of a TV or VCR, there may or may not be a networked aspect to the control thereof. Each client computer 146a, 146b, 146c, 146d, 146e, etc. and server computer 145a, 145b, etc. may be equipped with various application program modules or objects 148 and with connections or access to various types of storage elements or objects, across which files or data streams may be stored or to which portion(s) of files or data streams may be downloaded, transmitted or migrated. Any one or more of computers 145a, 145b, 146a, 146b, etc. may be responsible for the maintenance and updating of a database 149 or other storage element, such as a database or memory 149 for storing data processed according to the invention. Thus, the invention can be utilized in a computer network environment having client computers 146a, 146b, etc. that can access and interact with a computer network/bus 147 and server computers 145a, 145b, etc. that may interact with client computers 146a, 146b, etc. and other like devices, and databases 149.

Exemplary Computing Device

Figure 5B:
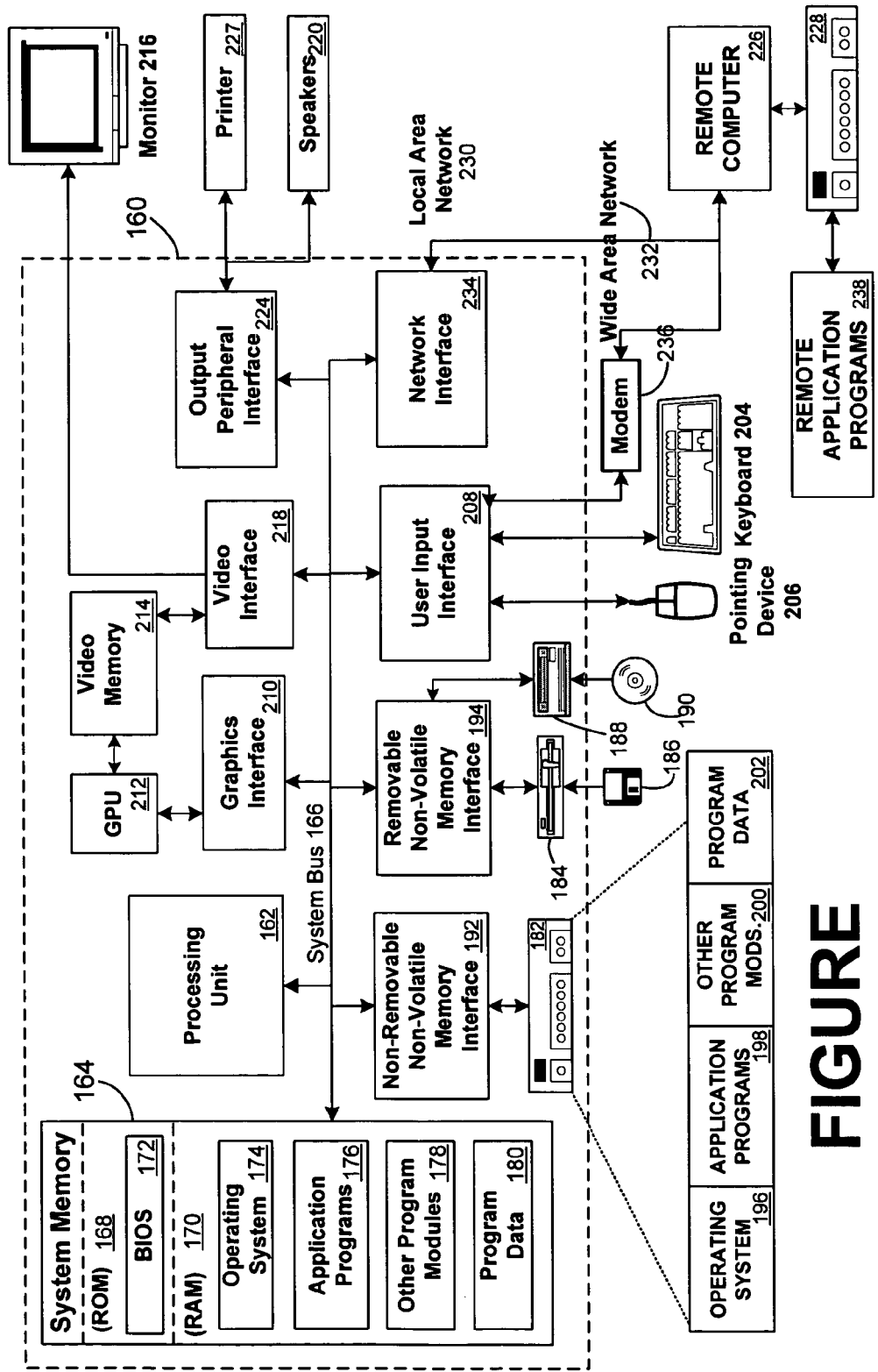
FIG. 5B is a block diagram representing an exemplary non-limiting host computing device in which the invention may be implemented.

FIG. 5B and the following discussion are intended to provide a brief general description of a suitable host computing environment in connection with which the invention may be implemented. It should be understood, however, that handheld, portable and other computing devices, portable and fixed gaming devices, and computing objects of all kinds are contemplated for use in connection with the invention. While a general purpose computer is described below, this is but one example, and the invention may be implemented with a thin client having network/bus interoperability and interaction. Thus, the invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the virtualization techniques in accordance with the invention.

Although not required, the invention can be implemented in whole or in part via an operating system, for use by a developer of services for a device or object, and/or included within application software that operates in connection with the virtualized OS of the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. As noted above, the invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 5B illustrates an example of a suitable host computing system environment 150 in which the invention may be implemented, although as made clear above, the host computing system environment 150 is only one example of a suitable computing environment and is not intended to suggest any limitation as to the scope of use or functionality of the invention. Neither should the computing environment 150 be interpreted as having any dependency or requirement relating to any one or combination of components illustrated in the exemplary operating environment 150.

With reference to FIG. 5B, an exemplary system for implementing the invention includes a general purpose computing device in the form of a computer 160. Components of computer 160 may include, but are not limited to, a processing unit 162, a system memory 164, and a system bus 166 that couples various system components including the system memory to the processing unit 162. The system bus 166 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus (also known as Mezzanine bus), and PCI Express (PCIe).

Computer 160 typically includes a variety of computer readable media. Computer readable media can be any available media that can be accessed by computer 160 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 160. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 164 includes computer storage media in the form of volatile and/or nonvolatile memory such as read only memory (ROM) 168 and random access memory (RAM) 170. A basic input/output system 172 (BIOS), containing the basic routines that help to transfer information between elements within computer 160, such as during start-up, is typically stored in ROM 168. RAM 170 typically contains data and/or program modules that are immediately accessible to and/or presently being operated on by processing unit 162. By way of example, and not limitation, FIG. 5B illustrates operating system 174, application programs 176, other program modules 178, and program data 180.

The computer 160 may also include other removable/non-removable, volatile/nonvolatile computer storage media. By way of example only, FIG. 5B illustrates a hard disk drive 182 that reads from or writes to non-removable, nonvolatile magnetic media, a magnetic disk drive 184 that reads from or writes to a removable, nonvolatile magnetic disk 186, and an optical disk drive 188 that reads from or writes to a removable, nonvolatile optical disk 190, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 182 is typically connected to the system bus 166 through a non-removable memory interface such as interface 192, and magnetic disk drive 184 and optical disk drive 188 are typically connected to the system bus 166 by a removable memory interface, such as interface 194.

The drives and their associated computer storage media discussed above and illustrated in FIG. 5B provide storage of computer readable instructions, data structures, program modules and other data for the computer 160. In FIG. 5B, for example, hard disk drive 182 is illustrated as storing operating system 196, application programs 198, other program modules 200 and program data 202. Note that these components can either be the same as or different from operating system 174, application programs 176, other program modules 178 and program data 180. Operating system 196, application programs 198, other program modules 200 and program data 202 are given different numbers here to illustrate that, at a minimum, they are different copies. A user may enter commands and information into the computer 160 through input devices such as a keyboard 204 and pointing device 206, commonly referred to as a mouse, trackball or touch pad. Other input devices (not shown) may include a microphone, joystick, game pad, satellite dish, scanner, or the like. These and other input devices are often connected to the processing unit 162 through a user input interface 208 that is coupled to the system bus 166, but may be connected by other interface and bus structures, such as a parallel port, game port or a universal serial bus (USB). These are the kinds of structures that are virtualized by the architectures of the invention. A graphics interface 210, such as one of the interfaces implemented by the Northbridge, may also be connected to the system bus 166. Northbridge is a chipset that communicates with the CPU, or host processing unit 162, and assumes responsibility for communications such as PCI, PCIe and accelerated graphics port (AGP) communications. One or more graphics processing units (GPUs) 212 may communicate with graphics interface 210. In this regard, GPUs 212 generally include on-chip memory storage, such as register storage and GPUs 212 communicate with a video memory 214. GPUs 212, however, are but one example of a coprocessor and thus a variety of coprocessing devices may be included in computer 160, and may include a variety of procedural shaders, such as pixel and vertex shaders. A monitor 216 or other type of display device is also connected to the system bus 166 via an interface, such as a video interface 218, which may in turn communicate with video memory 214. In addition to monitor 216, computers may also include other peripheral output devices such as speakers 220 and printer 222, which may be connected through an output peripheral interface 224.

The computer 160 may operate in a networked or distributed environment using logical connections to one or more remote computers, such as a remote computer 226. The remote computer 226 may be a personal computer, a server, a router, a network PC, a peer device or other common network node, and typically includes many or all of the elements described above relative to the computer 160, although only a memory storage device 228 has been illustrated in FIG. 5B. The logical connections depicted in FIG. 5B include a local area network (LAN) 230 and a wide area network (WAN) 232, but may also include other networks/buses. Such networking environments are commonplace in homes, offices, enterprise-wide computer networks, intranets and the Internet.

When used in a LAN networking environment, the computer 160 is connected to the LAN 230 through a network interface or adapter 234. When used in a WAN networking environment, the computer 160 typically includes a modem 236 or other means for establishing communications over the WAN 232, such as the Internet. The modem 236, which may be internal or external, may be connected to the system bus 166 via the user input interface 208, or other appropriate mechanism. In a networked environment, program modules depicted relative to the computer 160, or portions thereof, may be stored in the remote memory storage device. By way of example, and not limitation, FIG. 5B illustrates remote application programs 238 as residing on memory device 228. It will be appreciated that the network connections shown are exemplary and other means of establishing a communications link between the computers may be used.

There are multiple ways of implementing the invention, e.g., an appropriate API, tool kit, driver code, operating system, control, standalone or downloadable software object, etc. which enables applications and services to use the virtualized architecture(s), systems and methods of the invention. The invention contemplates the use of the invention from the standpoint of an API (or other software object), as well as from a software or hardware object that receives any of the aforementioned techniques in accordance with the invention. Thus, various implementations of the invention described herein may have aspects that are wholly in hardware, partly in hardware and partly in software, as well as in software.

As mentioned above, while exemplary embodiments of the invention have been described in connection with various computing devices and network architectures, the underlying concepts may be applied to any computing device or system in which it is desirable to emulate guest software. For instance, the various algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the virtualization techniques of the invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the invention. Additionally, any storage techniques used in connection with the invention may invariably be a combination of hardware and software.

While the invention has been described in connection with the preferred embodiments of the various figures, it is to be understood that other similar embodiments may be used or modifications and additions may be made to the described embodiment for performing the same function of the invention without deviating therefrom. For example, while exemplary network environments of the invention are described in the context of a networked environment, such as a peer to peer networked environment, one skilled in the art will recognize that the invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the invention in the context of a guest OS virtualized on a host OS, the invention is not so limited, but rather may be implemented to virtualize a second specialized processing unit cooperating with a main processor for other reasons as well. Moreover, the invention contemplates the scenario wherein multiple instances of the same version or release of an OS are operating in separate virtual machines according to the invention. It can be appreciated that the virtualization of the invention is independent of the operations for which the guest OS is used. It is also intended that the invention applies to all computer architectures, not just the Windows or Xbox architecture. Still further, the invention may be implemented in or across a plurality of processing chips or devices, and storage may similarly be effected across a plurality of devices. Therefore, the invention should not be limited to any single embodiment, but rather should be construed in breadth and scope in accordance with the appended claims.

What is claimed:

1. A method of enabling an application program executing on a virtualized legacy computer system to access physical hardware of a host computer system, the method comprising:
    responsive to an attempt by said application program to access hardware of said virtualized legacy computer system to perform an activity, generating a memory access violation;
    responsive to the generated memory access violation, providing to an emulator of said host computer system information identifying at least the hardware of said virtualized legacy computer system that said application program attempted to access; and
    said emulator of said host computer system emulating the hardware of the virtualized legacy computer system to perform the activity as expected by said application program in response to the requested hardware access of said virtualized legacy computer system.

2. The method as in claim 1, wherein said application program is a computer game.

3. The method as in claim 2, wherein said hardware of said virtualized legacy computer system is memory mapped and said attempt by said computer game to access said hardware of said virtualized legacy computer system comprises generating a write to a memory mapped address for the hardware of said virtualized legacy computer system.

4. The method as in claim 3, further comprising the step of denying access to said memory mapped address for the hardware of said virtualized legacy computer system.

5. The method as in claim 4, wherein access to said memory mapped address for the hardware of said virtualized legacy computer system is denied by denying write and/or read/write permission by said computer game to the memory mapped address of the hardware of said virtualized legacy computer system.

6. The method as in claim 4, wherein access to said memory mapped address for the hardware of said virtualized legacy computer system is denied by reducing page permissions for said application program to said memory mapped address.

7. The method as in claim 1, wherein said emulating step comprises the steps of using said information identifying said hardware of said virtualized legacy computer system to determine which hardware of said host computer system corresponds to said hardware of said virtualized legacy computer system and generating commands to said hardware of said host computer system that correspond to commands generated by said application program for accessing the hardware of said virtualized legacy computer system.

8. The method as in claim 1, wherein said virtualized legacy computer system and said emulator communicate via a shared memory of said host computer system.

9. A system comprising a processor configured to enable an application program executing on a virtualized legacy computer system to access physical hardware of a host computer system, the system comprising:
    a virtual machine system that virtualizes said legacy computer system and executes said application program on said virtualized legacy computer system, said virtual machine system generating a memory access violation when an attempt is made by said application program to access hardware of said virtualized legacy computer system to perform an activity, said memory access violation including information identifying at least the hardware of said virtualized legacy computer system that said application program attempted to access; and
    an emulator that uses said information from the generated memory access violation to emulate the hardware of the virtualized legacy computer system to perform the activity as expected by said application program in response to the requested hardware access of said virtualized legacy computer system.

10. The system as in claim 9, wherein said application program is a computer game and said legacy computer system and said host computer system are computer game systems.

11. The system as in claim 10, wherein said hardware of said virtualized legacy computer system is memory mapped and said computer game accesses said hardware of said virtualized legacy computer system by generating a write to a memory mapped address for the hardware of said virtualized legacy computer system.

12. The system as in claim 11, wherein said virtual machine is configured to deny access by said computer game to said memory mapped address for the hardware of said virtualized legacy computer system.

13. The system as in claim 12, wherein said virtual machine denies access to said memory mapped address of the hardware of said virtualized legacy computer system by denying write and/or read/write permission by said computer game to the memory mapped address of the hardware of said virtualized legacy computer system.

14. The system as in claim 12, wherein said virtual machine denies access to said memory mapped address of the hardware of said virtualized legacy computer system by reducing page permissions for said application program to said memory mapped address of the hardware of said virtualized legacy computer system.

15. The system as in claim 9, wherein said emulator uses said information identifying said hardware of said virtualized legacy computer system to determine which hardware of said host computer system corresponds to said hardware of said virtualized legacy computer system and generates commands to said hardware of said host computer system that correspond to commands generated by said application program for accessing the hardware of said virtualized legacy computer system.

16. The system as in claim 9, further comprising a shared memory of said host system that said virtual machine system and said emulator use to communicate with each other.

17. A computer readable storage medium that when inserted into a host computer system creates a processing system that enables an application program executing on a virtualized legacy computer system to access physical hardware of said host computer system, comprising:

virtual machine system software that virtualizes said legacy computer system and executes said application program on said virtualized legacy computer system, said virtual machine system software generating a memory access violation when an attempt is made by said application program to access hardware of said virtualized legacy computer system to perform an activity, said memory access violation including information identifying at least the hardware of said virtualized legacy computer system that said application program attempted to access; and emulation software that uses said information from the generated memory access violation to emulate the hardware of the virtualized legacy computer system to perform the activity as expected by said application program in response to the requested hardware access of said virtualized legacy computer system.

18. The computer readable storage medium as in claim 17, wherein said hardware of said virtualized legacy computer system is memory mapped and said virtual machine system software generates said memory access violation when said application program attempts to write a memory mapped address for the hardware of said virtualized legacy computer system.

19. The computer readable storage medium as in claim 17, wherein said emulation software uses said information identifying said hardware of said virtualized legacy computer system to determine which hardware of said host computer system corresponds to said hardware of said virtualized legacy computer system and generates commands to said hardware of said host computer system that correspond to commands generated by said application program for accessing the hardware of said virtualized legacy computer system.

20. The computer readable storage medium as in claim 17, wherein said virtual machine system software and said emulation software each comprise software that enable said virtual machine system software and said emulation software to communicate with each other via a shared memory of said host computer system.

* * * * *

UNITED STATES PATENT AND TRADEMARK OFFICE
CERTIFICATE OF CORRECTION

PATENT NO. : 7,496,495 B2  
APPLICATION NO. : 11/128460  
DATED : February 24, 2009  
INVENTOR(S) : Andrew R. Solomon et al.

Page 1 of 1

It is certified that error appears in the above-identified patent and that said Letters Patent is hereby corrected as shown below:

In column 20, line 50, in Claim 12, after "machine" insert -- system --.

In column 20, line 54, in Claim 13, after "machine" insert -- system --.

In column 20, line 60, in Claim 14, after "machine" insert -- system --.

Signed and Sealed this
Tenth Day of May, 2011

David J. Kappos
*Director of the United States Patent and Trademark Office*